US007472908B2

(12) United States Patent
Harris

(10) Patent No.: US 7,472,908 B2
(45) Date of Patent: Jan. 6, 2009

(54) PLAYING CARD WAGERING GAME AND METHOD THEREFOR

(76) Inventor: Stephen M. Harris, 1251 Corista Dr., Henderson, NV (US) 89052

( * ) Notice: Subject to any disclaimer, the term of this patent is extended or adjusted under 35 U.S.C. 154(b) by 755 days.

(21) Appl. No.: 10/847,925

(22) Filed: May 18, 2004

(65) Prior Publication Data

US 2005/0261045 A1 Nov. 24, 2005

(51) Int. Cl.
*G06F 17/00* (2006.01)
*G06F 19/00* (2006.01)

(52) U.S. Cl. ....................... 273/303; 273/292; 273/293; 463/11; 463/12; 463/13; 463/18

(58) Field of Classification Search ................. 273/292, 273/293, 303; 463/11, 12, 13, 18
See application file for complete search history.

(56) References Cited

U.S. PATENT DOCUMENTS

| | | | | |
|---|---|---|---|---|
| 5,397,128 | A * | 3/1995 | Hesse et al. | 273/292 |
| 5,713,573 | A * | 2/1998 | Nazaryan | 273/292 |
| 5,716,050 | A * | 2/1998 | Jagosz | 273/148 R |
| 6,029,976 | A * | 2/2000 | Brunelle | 273/309 |
| 6,039,650 | A * | 3/2000 | Hill | 463/47 |
| 6,113,102 | A * | 9/2000 | Marks et al. | 273/292 |
| 6,585,587 | B2 * | 7/2003 | Falciglia, Sr. | 463/13 |
| 6,902,166 | B2 * | 6/2005 | Stern | 273/292 |
| 2001/0040344 | A1 * | 11/2001 | Zahedi | 273/274 |
| 2002/0024178 | A1 * | 2/2002 | Lo | 273/292 |
| 2002/0033577 | A1 * | 3/2002 | Mims | 273/292 |
| 2003/0153380 | A1 * | 8/2003 | Dreaper et al. | 463/16 |
| 2004/0157656 | A1 * | 8/2004 | Jackson | 463/12 |
| 2004/0185933 | A1 * | 9/2004 | Nicely | 463/25 |
| 2007/0057464 | A1 * | 3/2007 | Cockrell, Jr. | 273/292 |
| 2007/0155462 | A1 * | 7/2007 | O'Halloran et al. | 463/16 |

* cited by examiner

*Primary Examiner*—John M Hotaling, II
*Assistant Examiner*—Adetokunbo Torimiro
(74) *Attorney, Agent, or Firm*—Jeffrey D. Moy; Weiss & Moy, P.C.

(57) ABSTRACT

A playing card wagering game which involves each player placing an ante bet. Cards are dealt, one face down to the player and one face down to the dealer. After looking at his card, each player makes two additional wagers. The dealer will then turn over his card. Each player then withdraws one of his wagers, leaving the ante bet and one wager. The dealer then draws three additional cards face up. The four dealer cards are added up with the player card to determine a winning number for each player.

15 Claims, 2 Drawing Sheets

PLAYING CARD WAGERING GAME AND METHOD THEREFOR

BACKGROUND OF THE INVENTION

1. Field of the Invention

This invention relates generally to a playing card game, and more specifically, to a playing card wagering game that may be played with a standard deck of playing cards or by video machine technology wherein the game is determined by a total count of cards dealt by the dealer plus the card or cards dealt to the player.

2. Description of the Prior Art

Presently, there are many different wagering games used in gambling establishments. The problem with many of these games are that they are difficult to understand. This relates to not only how to play but the strategy involved in playing. Thus, many people who would normally like to play and gamble, end up not playing.

Most people like to play wagering games that are fairly simple to understand and play. Ideally, a wagering game should have different wagering options for the players, yet be able to be played rapidly to a wager resolving outcome. Wagering games, particularly those intended primarily for play in gambling establishments, should provide players with a sense of participation and control, the opportunity to make decisions, and reasonable odds of winning even though the odds will favor the gambling establishment.

Therefore, a need existed to provide an improved wagering game. The improved wagering game must overcome the problems associated with prior art wagering games. The improved wagering game should be easy to play and understand. The improved wagering game should provide players with a sense of participation and control, the opportunity to make decisions, and reasonable odds of winning even though the odds will favor the gambling establishment.

SUMMARY OF THE INVENTION

In accordance with one embodiment of the present invention, it is an object of the present invention to provide an improved wagering game.

It is another object of the present invention to provide an improved wagering game that overcome the problems associated with prior art wagering games.

It is still another object of the present invention to provide an improved wagering game that is easy to play and understand.

It is still another object of the present invention to provide an improved wagering game that provides players with a sense of participation and control, the opportunity to make decisions, and reasonable odds of winning even though the odds will favor the gambling establishment.

BRIEF DESCRIPTION OF THE EMBODIMENTS

In accordance with one embodiment of the present invention, a method of playing a playing card wagering game is disclosed. The method comprises dealing a player card and a first dealer card; placing a wager on a range of numbers wherein the range of numbers relates to a total value of the cards dealt; displaying the first dealer card; dealing additional dealer cards; and totaling a value of the player card and all dealer cards.

In accordance with one embodiment of the present invention, a video playing card wagering game is disclosed. The video playing card wagering game has a video display adapted to display to a plurality of playing cards for the playing card wagering game. The video game has means for dealing a player card and a first dealer card; means for placing a wager on a range of numbers wherein the range of numbers relates to a total value of the cards dealt; means for displaying the first dealer card; means for dealing additional dealer cards; and means for totaling a value of the player card and all dealer cards.

In accordance with another embodiment of the present invention, a method of playing a video playing card wagering game is disclosed. The method comprises: providing a video display adapted to display a playing card hand; dealing a player card and a first dealer card; placing a wager on a range of numbers wherein the range of numbers relates to a total value of the cards dealt; displaying the first dealer card; dealing additional dealer cards; and totaling a value of the player card and all dealer cards.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 1:
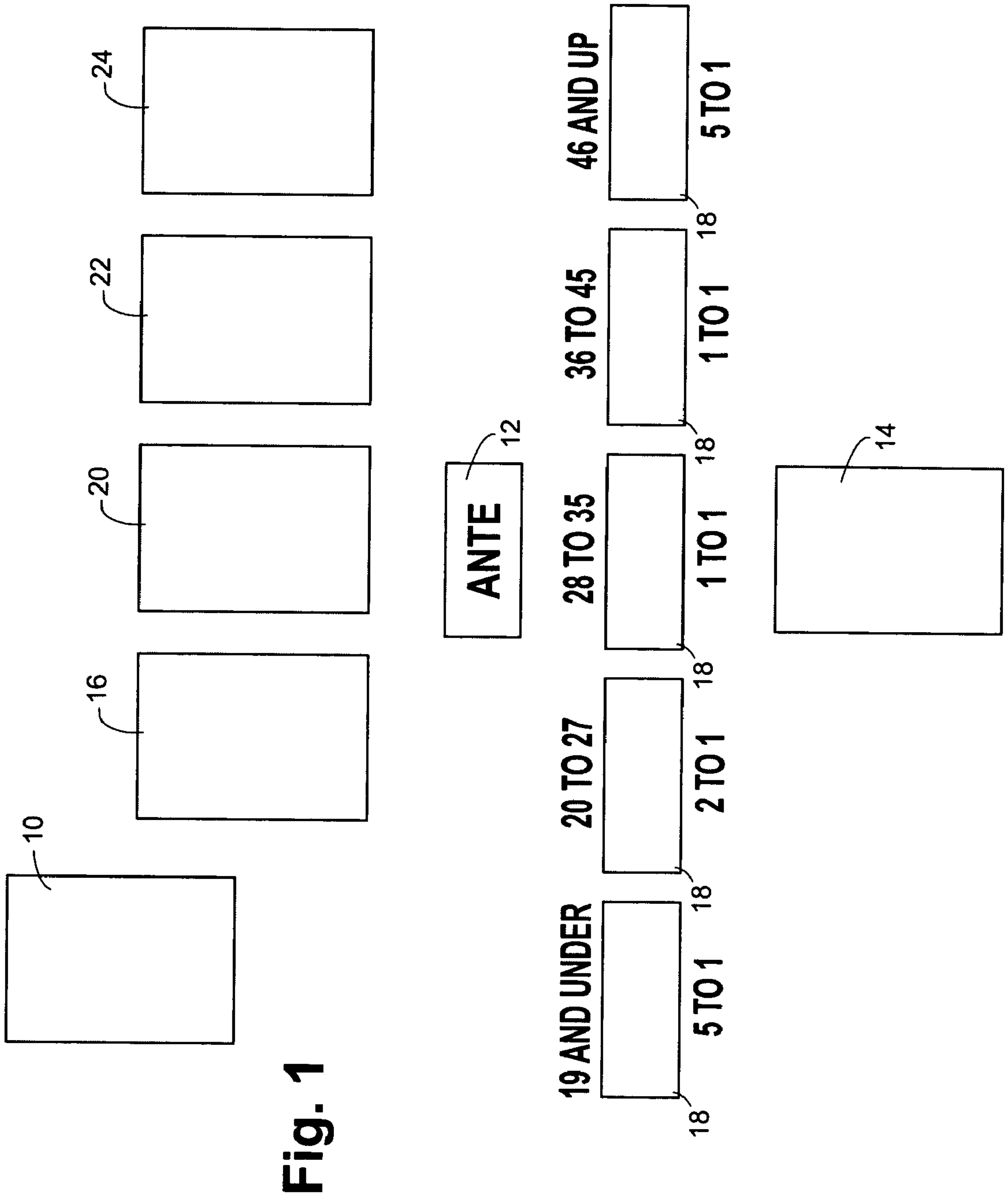
FIG. 1 is a simplified view of a table used in playing the wagering game of the present invention.

Referring now to the FIG. 1, the wagering game of the present invention will be disclosed. The wagering game is played with a standard deck of playing cards 10. Any number of decks 10 of playing cards may be used. In a preferred embodiment of the present invention, five decks of playing cards 10 are used. For security purposes in a gambling establishment, the cards may be dealt from a card dealer shoe.

In order to play, a player must place a minimum ante wager. The ante wager is placed on the ante wager location 12 on the playing surface. The ante wager can be any amount of money. In general, the minimum ante wager is determined by the gambling establishment. Once each player has placed a minimum ante wager, a dealer will deal one card face down to each player at a first card location 14 on the playing surface. The dealer also deals one card face down to himself at a dealer card location 16.

After the first cards are dealt to the players and the dealer, each player will take a look at the card dealt to the player. The player will then make two separate wagers on the wager locations 18 on the playing surface. The player will wager based on what he feels the total amount value of the five cards to be dealt (four cards to the dealer and one card to the player) will be. There will be a plurality of different possible wagers. In the embodiment depicted in FIG. 1, five possible wager options are shown. Each of the different wager options will have a range of numbers. For example, as shown in FIG. 1, one wager location 18 has a number range of 19 and under. A second wager location 18 is for a number range of 20 to 27. A third wager location 18 has a range of 28 to 35. A fourth wager location 18 has a range of 36 to 45. A fifth wager location 18 has a range of 46 and above. It should be noted that the number of wager locations 18 and the range of numbers for each wager location is given as an example and should not be seen as to limit the scope of the present invention. Each wager location 18 will have different payout odds associated with them. Payout odds may range from 1 to 1, to 2 to 1, to 5 to 1, etc. Again, the payout odds listed are given as an example and should not be seen as to limit the scope of the present invention.

After each player has placed two additional wagers in the wager location 18, the dealer will turn over his card at the dealer card location 16. Each player will then remove one of his wagers from the wager location 18. For example, a player may place wagers on wager locations 18 relating to a range of numbers from 20 to 27 and 36 to 45. After the dealer turns over his card, the player may remove one of these wagers (for example the player may remove the wager location 18 relating to a range of numbers from 20 to 27).

After each player has removed one of his wagers from the wager location 18, the dealer will deal three additional cards to himself. The cards will be placed face up card locations 20, 22 and 24 on the playing surface. The dealer will then count the total value of the dealers four cards on card locations 16, 20, 22, and 24, and the player's card at card location 14. A player will win if the total count of the four dealer cards and the player's card is within the range of numbers in the wager he selected. A player will lose his ante and his wager bet if the total sum count, of the four dealer cards and the player's card is not within the range of the number he bet. The odds listed on the playing surface will determine the pay outs. The ante wager pays even money.

In the game, each card has the follow point value:

2=2 points
3=3 points
4=4 points
5=5 points
6=6 points
7=7 points
8=8 points
9=9 points
10=10 points
Jack=10 points
Queen=10 points
King=10 points
Ace=1 or 11 points (Player's Option)

The following is given as an example of how to play the above game. A player places a minimum ante of $5.00 on the ante wager location 12 on the playing surface. The dealer will then deal a card face down to the player on card location 14 and face down to the dealer which is placed on card location 16. The player will then look at his card and make two wagers in any of the wager locations 18. If the player has a three of clubs, the player will probably want to place a bet wherein the total value of all cards dealt will be in a lower value range. Thus, the player will probably place a wager in wager location 18 related to 19 and under and wager location 18 related to a range of 20 to 27. For this example, the player will place a $10.00 bet in the above two locations. After the player has made a wager on these two locations, the dealer will then turn his card face up in card location 16. If the dealer's card is a nine of hearts, the player now has two choices. The player can remove the wager in wager location 18 related to 19 and under or the player can remove the wager in wager location 18 related to a range of 20 to 27. Since the sum of 3 and 9 is 12, the player should remove the wager in wager location 18 related to 19 and under. Thus, the player now has $15.00 in wagers currently riding (the $5.00 ante and the $10.00 in wager location 18 related to a range of 20 to 27). Once the wager is removed, the dealer will deal three more cards face up and place them in card locations 20, 22 and 24 on the playing surface. If the dealer is dealt a queen of hearts, a king of spades, and a jack of clubs, the total value of the dealer's hand is 39 (9+10+10+10). The player had a 3 of clubs, thus the total value of the player's hand is 42 (3+39) Since the player predicted a total value of the hand to range between 20 to 27, the player loses his $10 wager and his $5.00 ante wager.

If, on the other hand, the dealer is dealt a three of hearts, a five of spades, and an ace of clubs, the total value of the dealer's hand is 18 (9+3+5+1 (an ace is 1 or 11 points)). The player had a 3 of clubs, thus the total value of the player's hand is 21 (3+18). Since the player predicted a total value of the hand to range between 20 to 29, the player wins $20 on his $10 wager (2 to 1 odds) and $5.00 on his ante wager (the ante wager pays even money.)

A progressive, aggregate jackpot, wide area network jackpot, inter-casino linked jackpot, etc. may be awarded if the total count of the four dealer cards and the single player card equals a determined value. In addition, a progressive or aggregate jackpot may be awarded if four specific suited dealer cards plus the single player card suit equals a determined value. For example, a progressive or aggregate jackpot may be awarded for five aces of spades, a royal flush, or any other type of winning poker hand.

Figure 2:
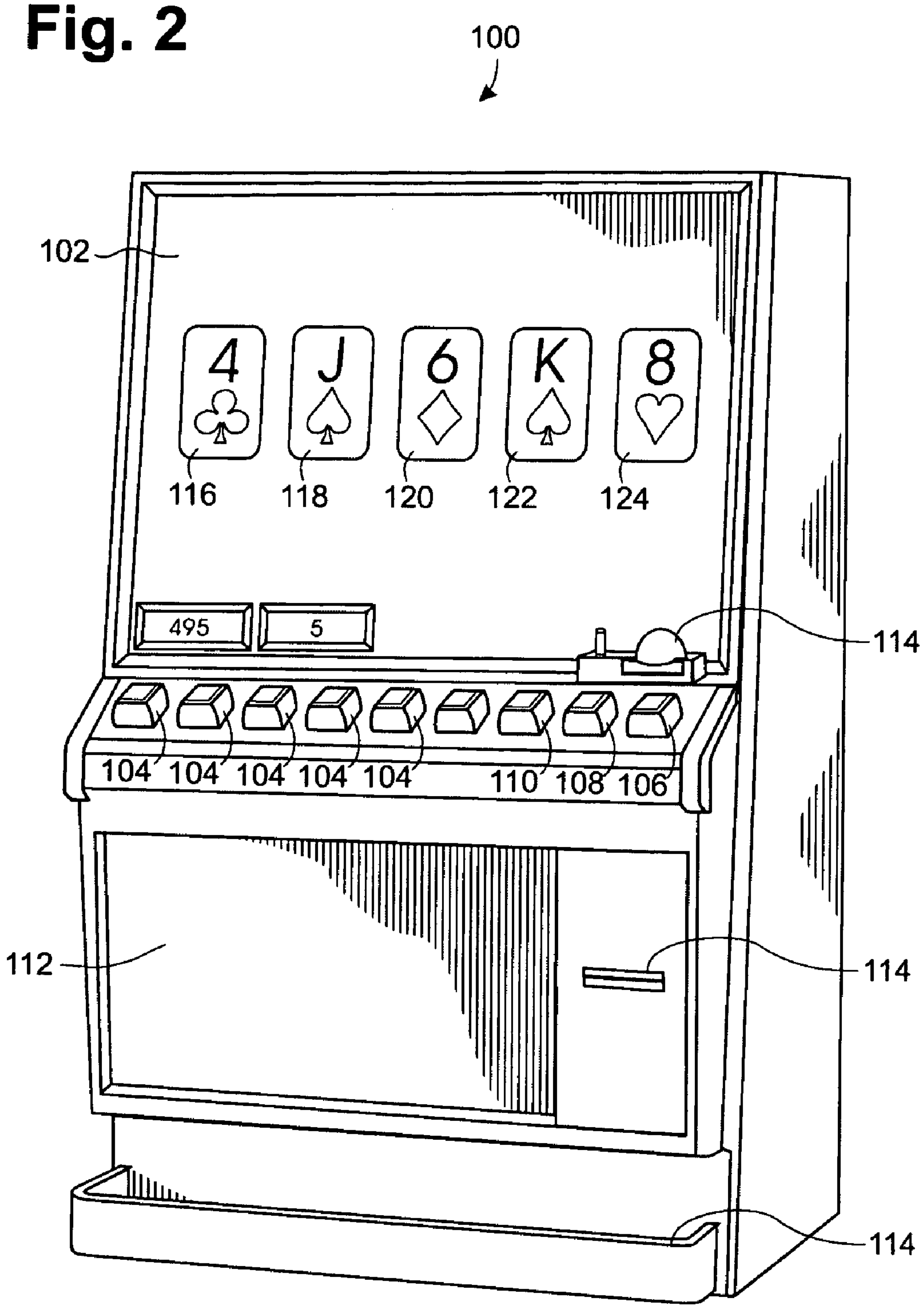
FIG. 2 is a front view of a video machine used in playing the wagering game of the present invention.

Referring now to FIG. 2, the playing card wagering game ofthe present invention may be implemented in an electronic version. In FIG. 2, a video machine terminal 100 is shown. Its main features include a video display 102, a plurality ofwager buttons 104, a deal button 106, an ante wager button 108, abutton to determine the number of credits to bet 110, a pay table 112, and a coin output 114. The terminal 100 should also have apayment receiver 115. The payment receiver 115 should beone through which coins, cash, payment cards, tickets, papercredits or the like may be inserted for purposes of placing a wager.

Play is initiated by the insertion of a payment into the payment receiver 115. A player will typically then depressthe ante wager button 108 in order to enter the ante wager. Oncethe ante wager is entered, the player's card is displayed face upon the video display 102. The player's card is generallydisplayed in a first position 116 on the video display 102.The player will then make two additional wagers using the wagersbuttons 104. The player can chose the amount of each wager byusing the credit button 110. After each player has placed twoadditional wagers by pressing two separate wager buttons 104, theplayer will press the deal button 106. The dealer's first cardwill be displayed at the dealer card location 118 on the videodisplay 102. Each player will then remove one of his wagersby pressing the wager button 104 of the wager that the playerwould like to remove.

After the player has removed one of his wagers, the player will press the deal button 106. Three additional cards will be displayed on the video display 102 in positions 120, 122, and 124. The terminal 100 will then count the total value of the dealers four cards at locations 118, 120, 122, and 124, and the player's card at card location 116. A player will win if the total count of the four dealer cards and the player's card is within the range of numbers in the wager he selected. A player will lose his ante and his wager bet if the total sum count of the four dealer cards and the player's card is not within the range of the number he bet.

The terminal 100 may include a bonus/jackpot feature. The player may be given an opportunity to win a jackpot based on the five cards displayed. The player will win if a bonus/ jackpot award if the five cards displayed represents a winning combination as shown in the payout odds area 112. The jackpot may be a progressive jackpot, aggregate jackpot, wide area network jackpot, inter-casino linked jackpot, etc. The bonus/jackpot amounts may be determined by the manufacturer or the gambling establishment. Some of the winning bonus/jackpot winning five card hands may be:

5 Aces of Spades
5 Aces of the same suit
5 Aces of any suit
Royal Flush
Straight Flush
Full House
Straight
Any other type of winning Poker hand While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of playing a playing card wagering game comprising:
- dealing a single player card to a player and a first dealer card to a dealer from a standard deck of playing cards, the player looking at the player card dealt;
- placing multiple wagers by the player on different wager locations, wherein each wager location represents different ranges of numbers, wherein the different ranges of numbers relate to a total combined value of the single player card added to the first dealer card, added to a plurality of additional dealer cards to be dealt in the current round;
- displaying the first dealer card;
- removing one of the multiple wagers placed by the player on the different wager locations after the first dealer card is displayed;
- dealing the additional plurality of dealer cards and displaying the additional plurality of dealer cards; and
- totaling the combined value of the single player card added to the first dealer card, added to a plurality of additional dealer cards to be dealt in the current round to determine if the total combined value is in a range of numbers wagered by the player.

2. The method of claim 1 wherein placing the wager further comprises:
- placing a first wager on a first range of numbers wherein the range of numbers relates to the total combined value of the cards dealt in a current round; and
- placing a second wager on a second range of numbers wherein the range of numbers relates to the total combined value of the cards dealt in a current round.

3. The method of claim 2 wherein removing one of the multiple wagers comprises removing one of the first wager or the second wager after displaying the first dealer card.

4. The method of claim 1 wherein dealing additional dealer cards comprises dealing three additional dealer cards face up.

5. The method of claim 1 wherein dealing the player card and the first dealer card further comprises dealing the player card and the first dealer card from a plurality of standard decks of playing cards.

6. A video playing card wagering game comprising:
- a video display adapted to display a plurality of playing cards for the playing card wagering game;
- means for dealing a single player card and a first dealer card;
- means for placing multiple wagers by the player on different wager locations, wherein each wager location represents different ranges of numbers, wherein the different ranges of numbers relate to a total combined value of the single player card added to the first dealer card, added to a plurality of additional dealer cards to be dealt in the current round;
- means for displaying the first dealer card;
- means for removing one of the multiple wagers placed by the player on the different wager locations after the first dealer card is displayed;
- means for dealing additional plurality of dealer cards; and
- means totaling the combined value of the single player card added to the first dealer card, added to a plurality of additional dealer cards to be dealt in the current round to determine if the total combined value is in a range of numbers wagered by the player.

7. The video playing card wagering game of claim 6 wherein means for placing the wager further comprises:
- means for placing a first wager on a first range of numbers wherein the range of numbers relates to the total combined value of the cards dealt in a current round; and
- means for placing a second wager on a second range of numbers wherein the range of numbers relates to the total combined value of the cards dealt in a current round.

8. The video playing card wagering game of claim 7 further comprising means for removing one of the first wager or the second wager after displaying the first dealer card.

9. The video playing card wagering game of claim 6 wherein the means for dealing additional dealer cards comprises means for dealing three additional dealer cards face up.

10. The video playing card wagering game of claim 6 wherein the means for dealing the player card and the first dealer card further comprises means for dealing the player card and the first dealer card from a plurality of standard decks of playing cards.

11. A method of playing a video playing card wagering game comprising:
- providing a video display adapted to display a playing card hand;
- dealing a single player card and a first dealer;
- placing multiple wagers by the player on different wager locations, wherein each wager location represents different ranges of numbers, wherein the different ranges of numbers relate to a total combined value of the single player card added to the first dealer card, added to a plurality of additional dealer cards to be dealt in the current round;
- displaying the first dealer card;
- removing one of the multiple wagers placed by the player on the different wager locations after the first dealer card is displayed;
- dealing the additional plurality of dealer; and
- totaling the combined value of the single player card added to the first dealer card, added to a plurality of additional dealer cards to be dealt in the current round to determine if the total combined value is in a range of numbers wagered by the player.

12. The method of claim 11 wherein placing the wager further comprises:
- placing a first wager on a first range of numbers wherein the range of numbers relates to the total combined value of the cards dealt in the current round; and
- placing a second wager on a second range of numbers wherein the range of numbers relates the total combined value of the cards dealt in the current round.

13. The method of claim 12 further comprising removing one of the first wager or the second wager after displaying the first dealer card.

14. The method of claim 11 wherein dealing additional dealer cards comprises dealing three additional dealer cards face up.

15. The method of claim 11 wherein dealing the player card and the first dealer card further comprises dealing the player card and the first dealer card from a plurality of standard deck of playing cards.

* * * * *